United States Patent
Oshitari et al.

(10) Patent No.: US 11,699,807 B2
(45) Date of Patent: Jul. 11, 2023

(54) POSITIVE ELECTRODE MATERIAL FOR LITHIUM ION SECONDARY BATTERIES, POSITIVE ELECTRODE FOR LITHIUM ION SECONDARY BATTERIES, AND LITHIUM ION SECONDARY BATTERY

(71) Applicant: Sumitomo Metal Mining Co., Ltd., Tokyo (JP)

(72) Inventors: Satoru Oshitari, Tokyo (JP); Kouji Oono, Tokyo (JP); Tsutomu Nozoe, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 160 days.

(21) Appl. No.: 17/033,109

(22) Filed: Sep. 25, 2020

(65) Prior Publication Data

US 2021/0305618 A1  Sep. 30, 2021

(30) Foreign Application Priority Data

Mar. 26, 2020 (JP) .................................. 2020-056157

(51) Int. Cl.
| | |
|---|---|
| *H01M 10/0525* | (2010.01) |
| *H01M 4/04* | (2006.01) |
| *H01M 4/36* | (2006.01) |
| *H01M 4/485* | (2010.01) |
| *H01M 4/505* | (2010.01) |
| *H01M 4/525* | (2010.01) |
| *H01M 4/62* | (2006.01) |
| *H01M 4/02* | (2006.01) |

(52) U.S. Cl.
CPC ..... *H01M 10/0525* (2013.01); *H01M 4/0404* (2013.01); *H01M 4/366* (2013.01); *H01M 4/485* (2013.01); *H01M 4/505* (2013.01); *H01M 4/525* (2013.01); *H01M 4/62* (2013.01); *H01M 2004/021* (2013.01); *H01M 2004/027* (2013.01); *H01M 2004/028* (2013.01)

(58) Field of Classification Search
CPC .......... H01M 10/0525; H01M 4/0404; H01M 4/366; H01M 4/485; H01M 4/505; H01M 4/525; H01M 2004/021; H01M 2004/027; H01M 2004/028
See application file for complete search history.

(56) References Cited

U.S. PATENT DOCUMENTS

| | | | | |
|---|---|---|---|---|
| 2012/0295163 | A1* | 11/2012 | Yanagita | H01M 4/523 252/519.51 |
| 2015/0263385 | A1* | 9/2015 | Yoon | H01M 4/587 429/333 |
| 2015/0318575 | A1 | 11/2015 | Choi et al. | |
| 2019/0386346 | A1* | 12/2019 | Suyama | H01M 4/366 |
| 2020/0091499 | A1* | 3/2020 | Yoshima | B60L 7/10 |

FOREIGN PATENT DOCUMENTS

| | | |
|---|---|---|
| JP | 2010-219065 A | 9/2010 |
| JP | 2012-256591 A | 12/2012 |
| JP | 2015-533020 A | 11/2015 |
| JP | 5997087 B | 9/2016 |
| KR | 20170067082 A * | 6/2017 |

OTHER PUBLICATIONS

Machine Translation of KR 20170067082A (Jun. 27, 2022) (Year: 2022).*
Office Action for Japanese Patent Application No. 2020-056157, dated Sep. 8, 2020.

* cited by examiner

*Primary Examiner* — Matthew J Merkling
(74) *Attorney, Agent, or Firm* — Merchant & Gould P.C.

(57) ABSTRACT

The positive electrode material for lithium ion secondary batteries includes a mixture including a positive electrode active material in which a length of a longest side of a primary particle is 1 nm or more and 1000 nm or less and a NASICON-type compound in which a length of a longest side of a primary particle is 1 nm or more and 1000 nm or less.

12 Claims, No Drawings

POSITIVE ELECTRODE MATERIAL FOR LITHIUM ION SECONDARY BATTERIES, POSITIVE ELECTRODE FOR LITHIUM ION SECONDARY BATTERIES, AND LITHIUM ION SECONDARY BATTERY

CROSS-REFERENCE TO RELATED APPLICATIONS

This application claims the benefit of Japanese Patent Application No. 2020-056157 filed Mar. 26, 2020, the disclosure of which is herein incorporated by reference in its entirety.

BACKGROUND OF THE INVENTION

Field of the Invention

The present invention relates to a positive electrode material for lithium ion secondary batteries, a positive electrode for lithium ion secondary batteries, and a lithium ion secondary battery.

Description of Related Art

While the development of a technique of mounting secondary batteries on an electric vehicle has progressed, improvement of high current density charge and discharge characteristics or low temperature charge and discharge characteristics has been required for the secondary batteries. In order to improve these characteristics, the particle diameter of primary particles has reduced to about 10 nm or more and 1000 nm or less to reduce a Li diffusion distance of a positive electrode active material or to increase a reaction area thereof. However, the refinement of the positive electrode active material leads to deterioration in powder handling characteristics such as a decrease in powder fluidity, fine particle size, or an increase in paste viscosity during electrode preparation, and thus it is difficult to prepare an excellent electrode or battery. In order to solve the above-described problem, in general, secondary particles of a positive electrode active material having a particle diameter of primary particles of about 2 μm or more and 50 μm or less are processed and used.

In lattice defects of primary particles forming an electrode active material, a crystal constituent element is likely to be eluted during charge and discharge, and the reliability during a cycle test or the like deteriorates. Lithium iron phosphate (LFP) prepared using a solid phase method is required to be calcinated at a high temperature in order to reduce lattice defects. When calcination is performed at a high temperature, the crystallite diameter increases, and the specific surface area of primary particles decreases. In addition, when the primary particle diameter excessively increases, an intermediate layer is likely to be formed during charge and discharge, and the reliability of cycle characteristics or the like deteriorates.

On the other hand, Japanese Laid-open Patent Publication No. 2010-219065 discloses an electrode active material having a small crystal strain. However, when the crystal strain is excessively small, diffusion of lithium in a plane direction is not likely to occur, and there is a problem in that the diffusion resistance of lithium increases.

In addition, Japanese Patent No. 5997087 discloses a method of producing a positive electrode material for lithium secondary batteries having a crystallite diameter more than a BET diameter and having a small strain. In Examples, the strain of crystallites was more than 0.1, and a positive electrode material for lithium secondary batteries in which the actual strain of crystallites was 0.1 or less was not able to be prepared.

Further, a secondary battery using the electrode active material described in Japanese Laid-open Patent Publication No. 2010-219065 or the positive electrode material for lithium secondary batteries described in Japanese Patent No. 5997087 has a problem in that the discharge capacity is low and the temperature during high-speed charge significantly increases.

SUMMARY OF THE INVENTION

The present invention has been made in consideration of the above-described circumstances, and an object thereof is to provide a positive electrode material for lithium ion secondary batteries that has excellent discharge capacity and can suppress an increase in the temperature of a lithium ion secondary battery during high-speed charge such as a charge rate of 3 C, a positive electrode for lithium ion secondary batteries, and a lithium ion secondary battery.

In order to achieve the object, the present inventors conducted a thorough investigation and found that, when a positive electrode material for lithium ion secondary batteries includes a mixture (secondary particles) including fine primary particles of a positive electrode active material and fine primary particles of a NASICON-type compound, it is possible to obtain a positive electrode material for lithium ion secondary batteries that has excellent discharge capacity and can suppress an increase in the temperature of a lithium ion secondary battery during high-speed charge, thereby completing the present invention.

In order to achieve the object, according to one aspect of the present invention, there is provided a positive electrode material for lithium ion secondary batteries including a mixture which includes a positive electrode active material in which a length of a longest side of a primary particle of the active material is 1 nm or more and 1000 nm or less and a NASICON-type compound in which a length of a longest side of a primary particle of the compound is 1 nm or more and 1000 nm or less.

In the aspect of the present invention, a mixing ratio of the positive electrode active material to the NASICON-type compound may be from 99.5:0.5 to 90.5:9.5 by mass ratio, a specific surface area of the mixture may be 7 $m^2/g$ or more and 40 $m^2/g$ or less, and in a case where a volume 50% particle diameter of secondary particles of the mixture is represented by D50, D50 may be 2 μm or more and 12 μm or less.

In the aspect of the present invention, one of, or both of, a surface of the primary particle of the positive electrode active material and a surface of the primary particle of the NASICON-type compound may be coated with a carbonaceous film having a thickness of 1 nm or more and 10 nm or less.

In the aspect of the present invention, the positive electrode active material may be represented by Formula $Li_xA_yD_zPO_4$ (wherein A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

In the aspect of the present invention, the NASICON-type compound may be represented by Formula $J_aTi_{2-b}M_b(P_{3-c}Q_cO_4)_3$ (wherein J represents at least one selected from the group consisting of Li, Na, and K, M represents at least one selected from the group consisting of Al, Zr, Cr and La, Q represents at least one selected from the group consisting of Si and S, $0.8 \leq a \leq 1.5$, $0 \leq b \leq 0.5$, and $0 \leq c \leq 0.6$).

According to another aspect of the present invention, there is provided a positive electrode for lithium ion secondary batteries, the positive electrode including: an electrode current collector; and a positive electrode mixture layer that is formed on the electrode current collector, in which the positive electrode mixture layer includes the positive electrode material for lithium ion secondary batteries according to the aspect of the present invention.

According to still another aspect of the present invention, there is provided a lithium ion secondary battery including: a positive electrode; a negative electrode; and a non-aqueous electrolyte, in which the positive electrode is the positive electrode for lithium ion secondary batteries according to the aforementioned aspect of the present invention.

The positive electrode material for lithium ion secondary batteries according to the present invention has excellent discharge capacity and can suppress an increase in the temperature of a lithium ion secondary battery during high-speed charge such as a charge rate of 3 C.

The positive electrode for lithium ion secondary batteries according to the present invention includes the positive electrode material for lithium ion secondary batteries according to the present invention. Therefore, it is possible to provide a positive electrode for lithium ion secondary batteries that has excellent discharge capacity and can suppress an increase in the temperature of a lithium ion secondary battery during high-speed charge such as a charge rate of 3 C.

The lithium ion secondary battery according to the present invention includes the positive electrode for lithium ion secondary batteries according to the present invention. Therefore, the discharge capacity is excellent, and an increase in the temperature of the lithium ion secondary battery during high-speed charge such as a charge rate of 3 C can be suppressed.

DETAILED DESCRIPTION OF THE INVENTION

An embodiment of a positive electrode material for lithium ion secondary batteries, a positive electrode for lithium ion secondary batteries, and a lithium ion secondary battery according to the present invention will be described.

The embodiment will be described in detail for easy understanding of the concept of the present invention, but the present invention is not limited thereto unless specified otherwise.

Positive Electrode Material for Lithium Ion Secondary Batteries

A positive electrode material for lithium ion secondary batteries according to the embodiment includes a mixture including a positive electrode active material in which a length of a longest side of a primary particle thereof is 1 nm or more and 1000 nm or less and a NASICON-type compound in which a length of a longest side of a primary particle thereof is 1 nm or more and 1000 nm or less. That is, the positive electrode material for lithium ion secondary batteries according to the embodiment includes the mixture (secondary particles) including primary particles of the positive electrode active material and primary particles of the NASICON-type compound.

In the positive electrode material for lithium ion secondary batteries according to the embodiment, examples of a shape of the primary particles of the positive electrode active material include a columnar shape, a plate shape, and a spherical shape. Regarding the shapes, the length of the longest side of the primary particles of the positive electrode active material is 1 nm or more and 1000 nm or less, preferably 30 nm or more and 800 nm or less, more preferably 50 nm or more and 500 nm or less, and still more preferably 100 nm or more and 300 nm or less. It is not preferable that the length of the longest side of the primary particles of the positive electrode active material is less than 1 nm because the capacity decreases due to an increase in the required amount of a carbon film or an increase in the amount of a binder required for electrode preparation. On the other hand, it is not preferable that the length of the longest side of the primary particles of the positive electrode active material is more than 1000 nm because a long period of time is required for movement of lithium ions or movement of electrons in the positive electrode active material such that the internal resistance increases and output characteristics deteriorate. In the positive electrode material for lithium ion secondary batteries according to the embodiment, the length of the longest side of the primary particles of the positive electrode active material refers to the average value of the lengths of longest sides of 100 primary particles of the positive electrode active material among the primary particles of the positive electrode active material in the positive electrode material for lithium ion secondary batteries according to the embodiment.

In the positive electrode material for lithium ion secondary batteries according to the embodiment, examples of a shape of the primary particles of the NASICON-type compound include a columnar shape, a plate shape, and a spherical shape. Regarding the shapes, the length of the longest side of the primary particles of the NASICON-type compound is 1 nm or more and 1000 nm or less, preferably 100 nm or more and 900 nm or less, more preferably 200 nm or more and 800 nm or less, and still more preferably 300 nm or more and 600 nm or less. It is not preferable that the length of the longest side of the primary particles of the NASICON-type compound is less than 1 nm because the capacity decreases due to an increase in the amount of a binder required for electrode preparation. On the other hand, when the length of the longest side of the primary particles of the NASICON-type compound is more than 1000 nm, the dispersibility and uniformity in the mixture (secondary particles) including the positive electrode active material and the NASICON-type compound deteriorate, and there is unevenness in the current or ion conduction in the secondary particles. Therefore, the discharge capacity during high-speed charge and discharge of the lithium ion secondary battery decreases. In the positive electrode material for lithium ion secondary batteries according to the embodiment, the length of the longest side of the primary particles of the NASICON-type compound refers to the average value of the lengths of longest sides of 100 primary particles of the NASICON-type compound among the primary particles of the NASICON-type compound in the positive electrode material for lithium ion secondary batteries according to the embodiment.

The length of the longest side of the primary particles of the positive electrode active material and the length of the longest side of the primary particles of the NASICON-type compound can be obtained by randomly selecting 100 primary particles, measuring the length of the longest side of each of the primary particles with a scanning electron microscope (SEM), and obtaining the average value thereof.

In the positive electrode material for lithium ion secondary batteries according to the embodiment, examples of the secondary particles as the mixture of the primary particles of the positive electrode active material and the primary particles of the NASICON-type compound include a spherical shape, an elliptical spherical shape, and an unstructured shape.

In the positive electrode material for lithium ion secondary batteries according to the embodiment, the average particle diameter of the secondary particles is preferably 2 µm or more and 12 µm or less and more preferably 3 µm or more and 10 µm or less. In a case where the average particle diameter of the secondary particles is 2 µm or more, when an electrode material, a conductive auxiliary agent, a binder resin (binder), and a solvent are mixed to prepare an electrode material paste for lithium ion secondary batteries, a significant increase in the amounts of the conductive auxiliary agent and the binder can be suppressed. As a result, the battery capacity of the lithium ion secondary battery per unit mass of the positive electrode material layer of the lithium ion secondary battery can be improved. On the other hand, when the average particle diameter of the secondary particles is 12 µm or less, the dispersibility and uniformity of the conductive auxiliary agent or the binder in the positive electrode material layer of the lithium ion secondary battery can be improved. As a result, the discharge capacity during high-speed charge and discharge of the lithium ion secondary battery increases.

The average particle diameter of the secondary particles refers to the average particle diameter D50 of the secondary particles corresponding to a cumulative percentage of 50% in a scattering intensity distribution obtained using a dynamic light scattering method. The average particle diameter D50 of the secondary particles can be measured using a dynamic light scattering particle diameter distribution analyzer (for example, manufactured by Horiba Ltd., model number: SZ-100SP). With the particle diameter distribution analyzer, the average particle diameter D50 of the secondary particles can be measured using a quartz cell having an optical path length of 10 mm×10 mm on a dispersion liquid having a solid content of 5% by mass adjusted with an alcohol compound.

In the positive electrode material for lithium ion secondary batteries according to the embodiment, a mixing ratio between the positive electrode active material and the NASICON-type compound is preferably 99.5:0.5 to 90.5:9.5 and more preferably 99.2:0.8 to 93:7 by mass ratio. When the mixing ratio between the positive electrode active material and the NASICON-type compound is in the above-described range, an increase in the temperature of the lithium ion secondary battery during high-speed charge can be suppressed and a sufficient discharge capacity can be secured without decreasing the proportion of the positive electrode active material more than necessary.

In the positive electrode material for lithium ion secondary batteries according to the embodiment, a specific surface area of the mixture including the positive electrode active material and the NASICON-type compound is preferably 7 $m^2/g$ or more and 40 $m^2/g$ or less and more preferably 10 $m^2/g$ or more and 30 $m^2/g$ or less. When the mixing ratio between the positive electrode active material and the NASICON-type compound is in the above-described range, an increase in the temperature of the lithium ion secondary battery during high-speed charge can be suppressed and a sufficient discharge capacity can be secured without decreasing the proportion of the positive electrode active material more than necessary.

In the positive electrode material for lithium ion secondary batteries according to the embodiment, the specific surface area of the mixture is measured using a specific surface area meter with a BET method using nitrogen ($N_2$) adsorption.

In the positive electrode material for lithium ion secondary batteries according to the embodiment, when a volume 50% particle diameter of the secondary particles of the mixture is represented by D50, D50 is preferably 2 µm or more and 12 µm or less and more preferably 3 µm or more and 10 µm or less. In a case where D50 is 2 µm or more, when an electrode material, a conductive auxiliary agent, a binder resin (binder), and a solvent are mixed to prepare an electrode material paste for lithium ion secondary batteries, a significant increase in the amounts of the conductive auxiliary agent and the binder can be suppressed. As a result, the battery capacity of the lithium ion secondary battery per unit mass of the positive electrode material layer of the lithium ion secondary battery can be improved. On the other hand, when D50 is 12 µm or less, the dispersibility and uniformity of the conductive auxiliary agent or the binder in the positive electrode material layer of the lithium ion secondary battery can be improved. As a result, the discharge capacity during high-speed charge and discharge of the lithium ion secondary battery increases.

D50 of the mixture refers to the particle diameter D50 of the mixture corresponding to a cumulative percentage of 50% in a scattering intensity distribution obtained using a dynamic light scattering method. D50 of the mixture can be measured using a dynamic light scattering particle diameter distribution analyzer (for example, manufactured by Horiba Ltd., model number: SZ-100SP). With the particle diameter distribution analyzer, D50 of the mixture can be measured using a quartz cell having an optical path length of 10 mm×10 mm on a dispersion liquid having a solid content of 5% by mass adjusted with an alcohol compound.

The positive electrode material for lithium ion secondary batteries according to the embodiment may include a carbon-coated positive electrode active material including the primary particles of the positive electrode active material, the primary particles of the NASICON-type compound, and a carbonaceous film (pyrolytic carbon film) with which surfaces of at least either the primary particles of the positive electrode active material or the primary particles of the NASICON-type compound and surfaces of the secondary particles (the mixture of the positive electrode active material and the NASICON-type compound) are coated. In addition, the positive electrode material for lithium ion secondary batteries according to the embodiment includes a granulated body that is produced using the primary particles of the carbon-coated positive electrode active material.

In the positive electrode material for lithium ion secondary batteries according to the embodiment, the thickness of the carbonaceous film with which surfaces of at least either the primary particles of the positive electrode active material or the primary particles of the NASICON-type compound are coated is preferably 1 nm or more and 10 nm or less, and more preferably 2 nm or more and 6 nm or less. When the thickness of the carbonaceous film with which the surfaces of the primary particles are coated is 1 nm or more, an increase in the sum of electron transfer resistances in the carbonaceous film can be suppressed. As a result, an increase in the internal resistance of the lithium ion battery can be suppressed, and a decrease in voltage during high charge-discharge rate can be prevented. On the other hand, when the thickness of the carbonaceous film with which the surfaces of the primary particles are coated is 10 nm or less, the formation of steric hindrance hindering diffusion of lithium ions in the carbonaceous film can be suppressed, and thus the lithium ion transfer resistance decreases. As a result, an increase in the internal resistance of the battery can be suppressed, and a decrease in voltage during high charge-discharge rate can be prevented.

In the positive electrode material for lithium ion secondary batteries according to the embodiment, the thickness of the carbonaceous film with which surfaces of the mixture (secondary particles) of the positive electrode active material and the NASICON-type compound are coated, that is, the thickness of the carbonaceous film in the primary particles of the carbon-coated positive electrode active material is preferably 1 nm or more and 10 nm or less and more preferably 2 nm or more and 6 nm or less. When the thickness of the carbonaceous film with which the surfaces of the primary particles are coated is 1 nm or more, a carbonaceous film having a desired resistance value can be formed without hindrance caused by an extremely small thickness of the carbonaceous film. On the other hand, when the thickness of the carbonaceous film with which the surfaces of the primary particles are coated is 10 nm or less, a decrease in the battery capacity per unit mass of the electrode material can be suppressed.

The thickness of the carbonaceous film with which the surfaces of the secondary particles are coated is measured, for example, using a transmission electron microscope (TEM) or an energy dispersive X-ray microanalyzer (EDX).

In the positive electrode material for lithium ion secondary batteries according to the embodiment, the average particle diameter of the primary particles of the carbon-coated positive electrode active material is preferably 1 nm or more and 1000 nm or less, more preferably 30 nm or more and 800 nm or less, and still more preferably 50 nm or more and 500 nm or less. When the average primary particle diameter of the carbon-coated positive electrode active material is 1 nm or more, an increase in the amount of carbon caused by an excessive increase in specific surface area can be suppressed. On the other hand, when the average primary particle diameter of the carbon-coated positive electrode active material is 1000 nm or less, the electron conductivity and the ion diffusion performance can be improved due to a large specific surface area.

The specific surface area of the carbon-coated positive electrode active material in the positive electrode material for lithium ion secondary batteries according to the embodiment is preferably 7 $m^2/g$ or more and 40 $m^2/g$ or less and more preferably 10 $m^2/g$ or more and 30 $m^2/g$ or less. When the specific surface area of the carbon-coated positive electrode active material is 7 $m^2/g$ or more, the diffusion rate of lithium ions in the positive electrode material can be increased, and the battery characteristics of the lithium ion secondary battery can be improved. On the other hand, when the specific surface area of the carbon-coated positive electrode active material is 40 $m^2/g$ or less, the electron conductivity can be improved.

In the positive electrode material for lithium ion secondary batteries according to the embodiment, the average particle diameter of the granulated body produced using the primary particles of the carbon-coated positive electrode active material is preferably 2 μm or more and 12 μm or less, more preferably 3 μm or more and 11 μm or less, and still more preferably 4 μm or more and 10 μm or less. In a case where the average particle diameter of the granulated body is 2 μm or more, when the positive electrode material, a conductive auxiliary agent, a binder resin (binder), and a solvent are mixed with each other to prepare a positive electrode material paste for lithium ion secondary batteries, the mixing amount of the conductive auxiliary agent and the binder can be reduced, and the battery capacity of the lithium ion secondary battery per unit mass of the positive electrode mixture layer for lithium ion secondary batteries can be increased. On the other hand, when the average particle diameter of the granulated body is 12 μm or less, the dispersibility and the uniformity of the conductive auxiliary agent or the binder included in the positive electrode mixture layer for lithium ion secondary batteries can be improved. As a result, in the lithium ion secondary battery in which the positive electrode material for lithium ion secondary batteries according to the embodiment is used, the discharge capacity during high-speed charge and discharge can be increased.

The average particle diameter of the granulated body is measured using a laser diffraction particle diameter analyzer after suspending the positive electrode material for lithium ion secondary batteries according to the embodiment in a dispersion medium in which 0.1% by mass of polyvinyl pyrrolidone is dissolved in water.

In the positive electrode material for lithium ion secondary batteries according to the embodiment, the carbon content in the primary particles of the carbon-coated positive electrode active material is preferably 0.5% by mass or more and 4.0% by mass or less, more preferably 0.7% by mass or more and 3.0% by mass or less, and still more preferably 0.8% by mass or more and 2.5% by mass or less. When the carbon content in the primary particles of the carbon-coated positive electrode active material is 0.5% by mass or more, the electron conductivity can be sufficiently improved. On the other hand, when the carbon content in the primary particles of the carbon-coated positive electrode active material is 4.0% by mass or less, the electrode density can be improved.

The carbon content in the primary particles of the carbon-coated positive electrode active material is measured using a carbon analyzer (carbon-sulfur analyzer: EMIA-810W (trade name), manufactured by Horiba Ltd.).

In the positive electrode material for lithium ion secondary batteries according to the embodiment, the coating ratio of the carbonaceous film in the primary particles of the carbon-coated positive electrode active material is preferably 80% or more, more preferably 90% or more, and still more preferably 95% or more. When the coating ratio of the carbonaceous film in the primary particles of the carbon-coated positive electrode active material is 80% or more, the coating effect of the carbonaceous film can be sufficiently obtained.

The coating ratio of the carbonaceous film in the primary particles of the carbon-coated positive electrode active material is measured, for example, using a transmission electron microscope (TEM) or an energy dispersive X-ray microanalyzer (EDX).

The positive electrode material for lithium ion secondary batteries according to the embodiment may include a component other than the above-described granulated body. Examples of the component other than the granulated body include a binder formed of a binder resin and a conductive auxiliary agent such as carbon black, acetylene black, graphite, Ketjen black, natural graphite, or artificial graphite.

The positive electrode material for lithium ion secondary batteries according to another embodiment may not include a carbonaceous film. That is, the positive electrode active material and the NASICON-type compound included in the mixture (secondary particle) may not have a carbonaceous film.

Positive Electrode Active Material

It is preferable that the positive electrode active material include an olivine positive electrode active material.

The olivine positive electrode active material is formed of a compound represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9<x<1.1$, $0<y\le1$, $0\le z<1$, and $0.9<y+z<1.1$).

From the viewpoints of high discharge capacity and high energy density, it is preferable that the positive electrode active material satisfies $0.9<x<1.1$, $0<y\le1$, $0\le z<1$, and $0.9<y+z<1.1$ in $Li_xA_yD_zPO_4$.

From the viewpoint that a positive electrode mixture layer that can realize high discharge potential and high safety, Co, Mn, Ni, or Fe is preferable as A, and Mg, Ca, Sr, Ba, Ti, Zn, or Al is preferable as D.

The crystallite diameter of the olivine positive electrode active material is preferably 30 nm or more and 300 nm or less and more preferably 50 nm or more and 250 nm or less. When the crystallite diameter of the olivine positive electrode active material is less than 30 nm, a large amount of carbon is required to sufficiently coat the surface of the positive electrode active material with the pyrolytic carbon film. In addition, since a large amount of a binder is required, the amount of the positive electrode active material in the positive electrode decreases, and the battery capacity may decrease. Likewise, the carbonaceous film may peel off due to an insufficient binding strength. On the other hand, when the crystallite diameter of the olivine positive electrode active material is more than 300 nm, the internal resistance of the positive electrode active material excessively increases, and thus when a battery is formed, the discharge capacity at the high charge-discharge rate may decrease. In addition, when charge and discharge is repeated, an intermediate phase is likely to be formed, and a constituent element is eluted from the intermediate phase. As a result, the capacity decreases.

As a method of calculating the crystallite diameter of the olivine positive electrode active material, the crystallite diameter can be determined by analyzing a powder X-ray diffraction pattern obtained by X-ray diffraction measurement using a Williamson-Hall method.

NASICON-Type Compound

The NASICON-type compound is formed of a compound represented by Formula $J_aTi_{2-b}M_b(P_{3-c}Q_cO_4)_3$ (where J represents at least one selected from the group consisting of Li, Na, and K, M represents at least one selected from the group consisting of Al, Zr, Cr and La, Q represents at least one selected from the group consisting of Si and S, $0.8\le a\le1.5$, $0\le b\le0.5$, and $0\le c\le0.6$).

It is preferable that the NASICON-type compound satisfies $0.8\le a\le1.5$, $0\le b\le0.5$, and $0\le c\le0.6$ in $J_aTi_{2-b}M_b(P_{3-c}Q_cO_4)_3$ because the transfer of lithium ions ($Li^+$) in the NASICON-type compound can be accelerated, an increase in internal resistance caused by the mixing of the NASICON-type compound can be suppressed, and a decrease in output characteristics can be suppressed.

It is preferable that J represents Li, Na, K, M represents Al, Zr, Cr, or La, and Q represents Si or S because the transfer of lithium ions ($Li^+$) in the NASICON-type compound can be accelerated, an increase in internal resistance caused by the mixing of the NASICON-type compound can be suppressed, and a decrease in output characteristics can be suppressed.

The crystallite diameter of the NASICON-type compound is preferably 50 nm or more and 800 nm or less and more preferably 80 nm or more and 500 nm or less. When the crystallite diameter of the NASICON-type compound is less than 50 nm, a filling factor of the mixture (secondary particles) including the positive electrode active material and the NASICON-type compound decreases, an apparent tap density decreases, and thus the energy density per volume decreases. On the other hand, when the crystallite diameter of the NASICON-type compound is more than 800 nm, the dispersibility and uniformity in the mixture (secondary particles) including the positive electrode active material and the NASICON-type compound deteriorate, and there is unevenness in the current or ion conduction in the secondary particles. Therefore, the discharge capacity during high-speed charge and discharge of the lithium ion secondary battery decreases.

As a method of calculating the crystallite diameter of the NASICON-type compound, the crystallite diameter can be determined by analyzing a powder X-ray diffraction pattern obtained by X-ray diffraction measurement using a Williamson-Hall method.

Carbonaceous Film

The carbonaceous film is a pyrolytic carbon film that is obtained by carbonizing an organic compound as a raw material. It is preferable that the carbon source that is a raw material of the carbonaceous film is derived from an organic compound in which the purity of carbon is 40.00% or higher and 60.00% or lower.

In the positive electrode material for lithium ion secondary batteries according to the embodiment, as a method of calculating "purity of carbon" in the carbon source that is a raw material of the carbonaceous film, when plural kinds of organic compounds are used, a method of calculating and adding the amounts of carbon (% by mass) in the mixing amounts of the respective organic compounds based on the mixing amounts (% by mass) of the respective organic compounds and the known purities (%) of carbon and calculating the "purity of carbon" in the carbon source from the following Formula (1) based on the total mixing amount (% by mass) and the total amount of carbon (% by mass) of the organic compounds is used.

Purity of Carbon (%)=Total amount of Carbon (% by mass)/Total Mixing Amount (% by mass)× 100 (1)

The positive electrode material for lithium ion secondary batteries according to the embodiment includes a mixture including a positive electrode active material in which a length of a longest side of a primary particle is 1 nm or more and 1000 nm or less and a NASICON-type compound in which a length of a longest side of a primary particle is 1 nm or more and 1000 nm or less. Therefore, it is possible to provide a positive electrode material for lithium ion secondary batteries that has excellent discharge capacity and can suppress an increase in the temperature of a lithium ion secondary battery during high-speed charge such as a charge rate of 3 C, a positive electrode for lithium ion secondary batteries, and a lithium ion secondary battery.

Method of producing Positive Electrode Material for Lithium Ion Secondary Batteries A method of producing a positive electrode material for lithium ion secondary batteries according to the embodiment is not particularly limited, and examples thereof include a method including: a step of preparing a dispersion by mixing $Li_xA_yD_zPO_4$ particles, $J_aTi_{2-b}M_b(P_{3-c}Q_cO_4)_3$ particles, and an organic compound, with each other and dispersing the mixture; a step of obtaining a dry material by drying the dispersion; a step of calcinating the dry material in a non-oxidative atmosphere to obtain a granulated body that is produced using primary particles of a carbon-coated electrode active material. The dispersion may include a solvent. Examples of the solvent include water. The organic compound which forms a carbon-coating may be omitted in the step of preparing the dispersion as needed.

The $Li_xA_yD_zPO_4$ particles are not particularly limited and are preferably obtained using, for example, a method including: introducing a Li source, an A source, a D source, and a $PO_4$ source into water such that a molar ratio x:y+z thereof is 1:1; stirring the components to obtain a $Li_xA_yD_zPO_4$ precursor solution; stirring and mixing the precursor solution at 15° C. or higher and 70° C. or lower for 1 hour or longer and 20 hours or shorter to prepare a hydration precursor solution; putting this hydration precursor solution into a pressure resistant vessel; and performing a hydrothermal treatment at a high temperature and a high pressure, for example, at 130° C. or higher and 190° C. or lower and 0.2 MPa or higher for 1 hour or longer and 20 hours or shorter.

In this case, by adjusting the temperature and the time during the stirring of the hydration precursor solution and the temperature, the pressure, and the time during the hydrothermal treatment, the particle diameter of the $Li_xA_yD_zPO_4$ particles can be controlled to be a desired diameter.

In this case, as the Li source, for example, at least one selected from the group consisting of a lithium inorganic acid salt such as lithium hydroxide (LiOH), lithium carbonate ($Li_2CO_3$), lithium chloride (LiCl), or lithium phosphate ($Li_3PO_4$) and a lithium organic acid salt such as lithium acetate ($LiCH_3COO$) or lithium oxalate (($COOLi)_2$).

Among these, lithium chloride or lithium acetate is preferable from the viewpoint of obtaining a uniform solution phase.

As the A source, at least one selected from the group consisting of a Co source formed of a cobalt compound, a Mn source formed of a manganese compound, a Ni source formed of a nickel compound, a Fe source formed of an iron compound, a Cu source formed of a copper compound, and a Cr source formed of a chromium compound is preferable.

In addition, as the D source, at least one selected from the group consisting of a Mg source formed of a magnesium compound, a Ca source formed of a calcium compound, a Sr source formed of a strontium compound, a Ba source formed of a barium compound, a Ti source formed of a titanium compound, a Zn source formed of a zinc compound, a B source formed of a boron compound, an Al source formed of an aluminum compound, a Ga source formed of a gallium compound, an In source formed of an indium compound, a Si source formed of a silicon compound, a Ge source formed of a germanium compound, a Sc source formed of a scandium compound, and a Y source formed of a yttrium compound is preferable.

As the $PO_4$ source, for example, at least one selected from the group consisting of phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$), and hydrates thereof is preferable.

In particular, orthophosphoric acid is preferable from the viewpoint of easily forming a uniform solution phase.

The $J_aTi_{2-b}M_b$ $(P_{3-c}Q_cO_4)_3$ particles are not particularly limited and are preferably obtained using, for example, a method including: mixing raw material powders of a J source, a Ti source, an M source, a P source, and a Q source with each other using a ball mill for 6 hours or longer and 48 hours or shorter such that a molar ratio thereof a:b:c is 1.3:0.3:0; pre-calcinating the mixed powder in air at 250° C. or higher and 400° C. or lower; crushing and mixing the pre-calcinated powder using an automated mortar for 0.5 hours or longer and 8 hours or shorter; and calcinating the crushed powder in air at 800° C. or higher and 1200° C. or lower for 12 hours or longer and 48 hours or shorter.

In this case, by adjusting the time during crushing using the automated mortar and the time and temperature during calcination, the particle diameter of the $J_aTi_{2-b}M_b$ $(P_{3-c}Q_cO_4)_3$ particles can be controlled to a desired size.

In this case, as the J source, at least one selected from the group consisting of a Li source formed of a lithium compound, a Na source formed of a sodium compound, and a K source formed of a potassium compound is preferable.

As the Ti source, for example, at least one selected from the group consisting of titanium compounds such as titanium oxide or lithium titanate.

As the M source, at least one selected from the group consisting of an Al source formed of an aluminum compound, a Zr source formed of a zirconium compound, a Cr source formed of a chromium compound, and a La source formed of a lanthanum compound is preferable.

As the P source, for example, at least one selected from the group consisting of phosphoric acid and phosphates such as diammonium hydrogen phosphate or ammonium dihydrogen phosphate is preferably used.

As the Q source, at least one selected from the group consisting of a Si source formed of a silicon compound and a S source formed of a sulfur compound is preferable.

In the method of producing a positive electrode material for lithium ion secondary batteries according to the embodiment, a mixing ratio between the $Li_xA_yD_zPO_4$ particles and the $J_aTi_{2-b}M_b$ $(P_{3-c}Q_cO_4)_3$ particles is preferably 99.5:0.5 to 90.5:9.5 and more preferably 99.2:0.8 to 93:7 by mass ratio.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyols.

Examples of the polyols include polyethylene glycol, polypropylene glycol, polyglycerin, and glycerin.

The organic compound is mixed such that the carbon content in the organic compound is 1 part by mass or more and 10 parts by mass or less with respect to 100 parts by mass of the $Li_xA_yD_zPO_4$ particles or 100 parts by mass that is the total mass of the $Li_xA_yD_zPO_4$ particles and the $J_aTi_{2-b}M_b(P_{3-c}Q_cO_4)_3$ particles.

Next, the obtained mixed liquid is dispersed to obtain a dispersion.

A dispersion method is not particularly limited and it is preferable to use a device capable of disentangling the agglomerated state of the $Li_xA_yD_zPO_4$ particles and the $J_aTi_{2-b}M_b$ $(P_{3-c}Q_cO_4)_3$ particles. Examples of the disperser include a ball mill, a sand mill, and a planetary mixer. In particular, by using a continuous disperser, sampling can be performed during the dispersion, and an end point can be easily determined using a span value.

Next, the dispersion is dried to obtain a dry material.

In this step, a drying method is not particularly limited as long as a solvent (water) can be removed from the dispersion.

In order to prepare agglomerated particles, the dispersion is dried using a spray drying method. For example, a method of spraying and drying the dispersion in a high temperature atmosphere at 100° C. or higher and 300° C. or lower to obtain a particulate dry material or a granular dry material can be used.

Next, the dry material is calcinated in a non-oxidative atmosphere in a temperature range of 700° C. or higher and 1000° C. or lower and preferably 800° C. or higher and 900° C. or lower.

As the non-oxidative atmosphere, an inert atmosphere such as nitrogen ($N_2$) or argon (Ar) is preferable, and when it is desired to further suppress oxidation, a reducing atmosphere including reducing gas such as hydrogen ($H_2$) is preferable.

Here, the reason why the calcination temperature of the dry material is 700° C. or higher and 1000° C. or lower is that, it is not preferable that the calcination temperature is lower than 700° C. because the decomposition reaction of the organic compound included in the dry material do not sufficiently progress, the carbonization of the organic compound is insufficient, and the produced decomposition reaction product is a high-resistance organic decomposition product. On the other hand, when the calcination temperature is higher than 1000° C., a component constituting the dry material, for example, lithium (Li) is evaporated such that the composition deviates, particle growth in the dry material is promoted, the discharge capacity at a high charge-discharge rate decreases, and it is difficult to realize sufficient charge and discharge rate performance. In addition, impurities are produced, and these impurities cause deterioration in capacity when charge and discharge is repeated.

The calcination time is not particularly limited as long as the organic compound can be sufficiently carbonized. For example, the calcination time is 0.1 hours or longer and 10 hours or shorter.

Through the calcination, a granulated body that is produced using the primary particles of the carbon-coated electrode active material can be obtained. The obtained granulated body is the positive electrode material for lithium ion secondary batteries according to the embodiment.

The method of producing positive electrode material is not limited to the method described above. For example, the positive electrode material may be produced such that $Li_xA_yD_zPO_4$ particles, $J_aTi_{2-b}M_b(P_{3-c}Q_cO_4)_3$ particles, and optionally organic compound are sufficiently mixed with a medium such as water to form an aqueous dispersion, and then the aqueous dispersion may be dried to form a target granulated particles (secondary particle) using a drying method such as a spray drying. When the organic compound is included in the dispersion, a heating step is preferably performed under optionally selected conditions, after the drying step. In the mixing step, the order of mixing can be optionally selected.

Positive Electrode for Lithium Ion Secondary Batteries

The positive electrode for lithium ion secondary batteries according to the embodiment includes: an electrode current collector; and a positive electrode mixture layer (electrode) that is formed on the electrode current collector, in which the positive electrode mixture layer includes the positive electrode material for lithium ion secondary batteries according to the embodiment.

That is, in the positive electrode for lithium ion secondary batteries according to the embodiment, the positive electrode mixture layer is formed on one main surface of the electrode current collector using the positive electrode material for lithium ion secondary batteries according to the embodiment.

A method of producing the positive electrode for lithium ion secondary batteries according to the embodiment is not particularly limited as long as the positive electrode mixture layer can be formed on one main surface of the electrode current collector using the positive electrode material for lithium ion secondary batteries according to the embodiment. Examples of the method of producing the positive electrode for lithium ion secondary batteries according to the embodiment include the following method.

First, the positive electrode material for lithium ion secondary batteries according to the embodiment, a binder, a conductive auxiliary agent, and a solvent are mixed with each other to prepare a positive electrode material paste for lithium ion secondary batteries.

Binder

As the binder, that is, as a binder resin, for example, a polytetrafluoroethylene (PTFE) resin, a polyvinylidene fluoride (PVdF) resin, or a fluororubber is preferably used.

When the total mass of the positive electrode material for lithium ion secondary batteries according to the embodiment, the binder, and the conductive auxiliary agent is represented by 100% by mass, the content rate of the binder in the positive electrode material paste for lithium ion secondary batteries is preferably 1% by mass or more and 10% by mass or less and more preferably 2% by mass or more and 6% by mass or less.

Conductive Auxiliary Agent

The conductive auxiliary agent is not particularly limited, and for example, at least one selected from the group consisting of acetylene black, Ketjen black, Furnace black, and filamentous carbon such as vapor-grown carbon fiber (VGCF) or carbon nanotube is used.

When the total mass of the positive electrode material for lithium ion secondary batteries according to the embodiment, the binder, and the conductive auxiliary agent is represented by 100% by mass, the content rate of the conductive auxiliary agent in the positive electrode material paste for lithium ion secondary batteries is preferably 1% by mass or more and 15% by mass or less and more preferably 3% by mass or more and 10% by mass or less.

Solvent

The solvent may be appropriately added to the positive electrode material paste for lithium ion secondary batteries including the positive electrode material for lithium ion secondary batteries according to the embodiment so as to easily coat a coating object such as the electrode current collector with the paste.

The solvent used for forming the positive electrode material paste for lithium ion secondary batteries may be appropriately selected depending on the characteristics of the binder resin.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycolmonoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethylformamide, N,N-dimethylacetoacetamide, and N-methylpyrrolidone; and glycols such as ethylene glycol, diethylene glycol, and propylene glycol. Among these solvents, one kind may be used alone, or a mixture of two or more kinds may be used.

When the total mass of the positive electrode material for lithium ion secondary batteries according to the embodiment, the binder, and the solvent is represented by 100 parts by mass, the content rate of the solvent in the positive electrode material paste for lithium ion secondary batteries is preferably 60 parts by mass or more and 400 parts by mass or less and more preferably 80 parts by mass or more and 300 parts by mass or less.

By controlling the content of the solvent to be in the above-described range, the positive electrode material paste for lithium ion secondary batteries having good electrode formability and good battery characteristics can be obtained.

A method of mixing the positive electrode material for lithium ion secondary batteries according to the embodiment, the binder, the conductive auxiliary agent, and the solvent with each other is not particularly limited as long as it is a method capable of uniformly mixing the components. For example, a method of using a kneader such as a ball mill, a sand mill, a planetary mixer, a paint shaker, or a homogenizer can be used.

Next, one main surface of the electrode current collector is coated with the positive electrode material paste for lithium ion secondary batteries to form a film thereon, and this coating film is dried and compressed. As a result, the positive electrode for lithium ion secondary batteries in which the positive electrode mixture layer is formed on the main surface of the electrode current collector can be obtained.

The positive electrode for lithium ion secondary batteries according to the embodiment includes the positive electrode material for lithium ion secondary batteries according to the embodiment. Therefore, it is possible to provide a positive electrode for lithium ion secondary batteries that has excellent discharge capacity and can suppress an increase in the temperature of a lithium ion secondary battery during high-speed charge such as a charge rate of 3 C.

Lithium Ion Secondary Battery

The lithium ion secondary battery according to the embodiment includes a positive electrode, a negative electrode, and a non-aqueous electrolyte, in which the positive electrode for lithium ion secondary batteries according to the embodiment is provided as the positive electrode.

In the lithium ion secondary battery according to the embodiment, the negative electrode, the non-aqueous electrolyte, the separator, and the like are not particularly limited.

The negative electrode can be formed of, for example, a negative electrode material such as metal Li, a carbon material, a Li alloy, or $Li_4Ti_5O_{12}$.

In addition, a solid electrolyte may be used instead of the non-aqueous electrolyte and the separator.

The non-aqueous electrolyte can be prepared by mixing ethylene carbonate (EC) and ethyl methyl carbonate (EMC) with each other at a volume ratio of 1:1 to obtain a mixed solvent, and dissolving lithium hexafluorophosphate ($LiPF_6$) in the obtained mixed solvent such that the concentration thereof is, for example, 1 mol/dm$^3$.

As the separator, for example, porous propylene can be used.

The lithium ion secondary battery according to the embodiment includes the positive electrode for lithium ion secondary batteries according to the embodiment, and thus has excellent discharge capacity and can suppress an increase in the temperature of a lithium ion secondary battery during high-speed charge such as a charge rate of 3 C.

EXAMPLES

Hereinafter, the present invention will be described in detail using Examples and Comparative Examples, but is not limited to the following examples.

Example 1

A mixture including $LiFePO_4$ and $Li_{1.3}Al_{0.3}Ti_{1.7}(PO_4)_3$ was produced as follows.

First, synthesis of $LiFePO_4$ will be described.

$Li_3PO_4$ was used as a Li source and a P source, a $FeSO_4$ aqueous solution was used as a Fe source, and these sources were mixed with each other such that a molar ratio Li:Fe:P between Li, Fe, and P was 3:1:1. As a result, a 2.2 L raw material slurry A was prepared.

Next, the raw material slurry A was put into a pressure resistant vessel.

Next, the raw material slurry A was heated at 175° C. for 28 hours to perform a hydrothermal synthesis. At this time, the internal pressure of the pressure resistant vessel was 0.8 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFePO_4$ (LFP) particles.

4% by mass of polyvinyl alcohol having a solid content of 20% by mass that was adjusted in advance with respect to 96% by mass of the $LiFePO_4$ (LFP) particles was dispersed in water solvent to prepare a raw material slurry B, and the raw material slurry B was dried and granulated, and was heated at 750° C. for 1 hour such that surfaces of the LFP particles were coated with the carbonaceous film.

Next, using a jet mill (trade name: SJ-100, manufactured by Nisshin Engineering Inc.), the granulated LFP particles were cracked under conditions of a supply rate of 200 g/h.

Next, synthesis of $Li_{1.3}Al_{0.3}Ti_{1.7}(PO_4)_3$ will be described.

$Li_2CO_3$ was used as a Li source, $Al_2O_3$ was used as an Al source, $TiO_2$ was used as a Ti source, and $NH_4H_2PO_4$ was used as a $PO_4$ source, and these sources were mixed with each other using a ball mill for 10 hours such that a molar ratio Li:Al:Ti:$PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)_3$ particles were obtained.

Next, 1% by mass of the $Li_{1.3}Al_{0.3}Ti_{1.7}(PO_4)_3$ particles with respect to 99% by mass of the cracked LFP particles were dispersed in water solvent to prepare a raw material slurry C, and the raw material slurry C was dried and granulated. As a result, a mixture in which the $Li_{1.3}Al_{0.3}Ti_{1.7}(PO_4)_3$ particles were uniformly present as the LFP particles in the mixture secondary particles was produced, and a positive electrode material for lithium ion secondary batteries according to Example 1 was obtained.

Example 2

A positive electrode material for lithium ion secondary batteries according to Example 2 was obtained using the same method as that of Example 1, except that 4% by mass of the $Li_{1.3}Al_{0.3}Ti_{1.7}(PO_4)_3$ particles with respect to 96% by mass of the cracked LFP particles were dispersed in water solvent to prepare a raw material slurry C, and the raw material slurry C was dried and granulated.

Example 3

A mixture including $LiFePO_4$ and $Li_{1.3}Al_{0.3}Ti_{1.7}(PO_4)_3$ was produced as follows.

First, synthesis of $LiFePO_4$ will be described.

$Li_3PO_4$ was used as a Li source and a P source, a $FeSO_4$ aqueous solution was used as a Fe source, and these sources were mixed with each other such that a molar ratio Li:Fe:P between Li, Fe, and P was 3:1:1. As a result, a 2.2 L raw material slurry A was prepared.

Next, the raw material slurry A was put into a pressure resistant vessel.

Next, the raw material slurry A was heated at 175° C. for 28 hours to perform a hydrothermal synthesis. At this time, the internal pressure of the pressure resistant vessel was 0.8 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFePO_4$ (LFP) particles.

Next, synthesis of $Li_{1.3}Al_{0.3}Ti_{1.7}(PO_4)_3$ will be described.

$Li_2CO_3$ was used as a Li source, $Al_2O_3$ was used as an Al source, $TiO_2$ was used as a Ti source, and $NF_4H_2PO_4$ was used as a $PO_4$ source, and these sources were mixed with each other using a ball mill for 10 hours such that a molar ratio Li:Al:Ti:$PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)_3$ particles were obtained.

Next, 90.24% by mass of the LFP particles and 5.76% by mass of the $Li_{1.3}Al_{0.3}Ti_{1.7}(PO_4)_3$ particles were mixed with each other, 4% by mass of polyvinyl alcohol having a solid content of 20% by mass that was adjusted in advance with respect to the mixture was dispersed in water solvent to prepare a raw material slurry D, and the raw material slurry D was dried and granulated and then was heated at 750° C. for 1 hour. As a result, surfaces of the LFP particles and the $Li_{1.3}Al_{0.3}Ti_{1.7}(PO_4)_3$ particles were coated with the carbonaceous film, and a positive electrode material for lithium ion secondary batteries according to Example 3 was obtained.

Comparative Example 1

$LiFePO_4$ was produced as follows.

$Li_3PO_4$ was used as a Li source and a P source, a $FeSO_4$ aqueous solution was used as a Fe source, and these sources were mixed with each other such that a molar ratio Li:Fe:P between Li, Fe, and P was 3:1:1. As a result, a 2.2 L raw material slurry A was prepared.

Next, the raw material slurry A was put into a pressure resistant vessel.

Next, the raw material slurry A was heated at 175° C. for 28 hours to perform a hydrothermal synthesis. At this time, the internal pressure of the pressure resistant vessel was 0.8 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFePO_4$ (LFP) particles.

4% by mass of polyvinyl alcohol having a solid content of 20% by mass that was adjusted in advance with respect to 96% by mass of the $LiFePO_4$ (LFP) particles was dispersed in water solvent to prepare a raw material slurry B, and the raw material slurry B was dried and granulated, and was heated at 750° C. for 1 hour such that surfaces of the LFP particles were coated with the carbonaceous film. As a result, a positive electrode material for lithium ion secondary batteries according to Comparative Example 1 was obtained.

Example 7

A positive electrode material for lithium ion secondary batteries according to Comparative Example 2 was obtained using the same method as that of Example 1, except that 10% by mass of the $Li_{1.3}Al_{0.3}Ti_{1.7}(PO_4)_3$ particles with respect to 90% by mass of the cracked LFP particles were dispersed in water solvent to prepare a raw material slurry C, and the raw material slurry C was dried and granulated.

Example 4

A mixture including $LiFe_{0.26}Mn_{0.7}Mg_{0.0349}Co_{0.05}Ca_{0.001}PO_4$ and $Li_{1.3}Al_{0.3}Ti_{1.7}(PO_4)_3$ was produced as follows.

First, synthesis of $LiFe_{0.26}Mn_{0.7}Mg_{0.0349}Co_{0.05}Ca_{0.001}PO_4$ will be described.

$Li_3PO_4$ was used as a Li source and a P source, a $FeSO_4$ aqueous solution was used as a Fe source, and a $MnSO_4$ aqueous solution was used as an Mn source, $MgSO_4$ was used as an Mg source, a $CoSO_4$ aqueous solution was used as a Co source, and a $CaSO_4$ aqueous solution was used as a Ca source, and these sources were mixed with each other such that a molar ratio Li:Fe:Mn:Mg:Co:Ca:P of Li, Fe, Mn, Mg, Co, Ca, and P was 1:0.26:0.7:0.0349:0.05:0.001:1. As a result, a 2.2 L raw material slurry A was prepared.

Next, the raw material slurry A was put into a pressure resistant vessel.

Next, the raw material slurry A was heated at 190° C. for 12 hours to perform a hydrothermal synthesis. At this time, the internal pressure of the pressure resistant vessel was 1.0 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFe_{0.26}Mn_{0.7}Mg_{0.0349}Co_{0.05}Ca_{0.001}PO_4$ (LFMP) particles.

4% by mass of polyvinyl alcohol having a solid content of 20% by mass that was adjusted in advance with respect to 96% by mass of the $LiFe_{0.26}Mn_{0.7}Mg_{0.0349}Co_{0.05}Ca_{0.001}PO_4$ (LFMP) particles was dispersed in water solvent to prepare a raw material slurry B, and the raw material slurry B was dried and granulated, and was heated at 750° C. for 1 hour such that surfaces of the LFMP particles were coated with the carbonaceous film.

Next, using a jet mill (trade name: SJ-100, manufactured by Nisshin Engineering Inc.), the granulated LFMP particles were cracked under conditions of a supply rate of 200 g/h.

Next, synthesis of $Li_{1.3}Al_{0.3}Ti_{1.7}(PO_4)_3$ will be described.

$Li_2CO_3$ was used as a Li source, $Al_2O_3$ was used as an Al source, $TiO_2$ was used as a Ti source, and $NF_4H_2PO_4$ was used as a $PO_4$ source, and these sources were mixed with each other using a ball mill for 10 hours such that a molar ratio $Li:Al:Ti:PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)_3$ particles were obtained.

Next, 1% by mass of the $Li_{1.3}Al_{0.3}Ti_{1.7}(PO_4)_3$ particles with respect to 99% by mass of the cracked LFMP particles were dispersed in water solvent to prepare a raw material slurry C, and the raw material slurry C was dried and granulated. As a result, a mixture in which the $Li_{1.3}Al_{0.3}Ti_{1.7}(PO_4)_3$ particles were uniformly present as the LFMP particles in the mixture secondary particles was produced, and a positive electrode material for lithium ion secondary batteries according to Example 4 was obtained.

Example 5

A positive electrode material for lithium ion secondary batteries according to Example 5 was obtained using the same method as that of Example 4, except that 4% by mass of the $Li_{1.3}Al_{0.3}Ti_{1.7}(PO_4)_3$ particles with respect to 96% by mass of the cracked LFMP particles were dispersed in water solvent to prepare a raw material slurry C, and the raw material slurry C was dried and granulated.

Example 6

A mixture including $LiFe_{0.26}Mn_{0.7}Mg_{0.0349}Co_{0.05}Ca_{0.001}PO_4$ and the carbon film $Li_{1.3}Al_{0.3}Ti_{1.7}(PO_4)_3$ was produced as follows.

First, synthesis of $LiFe_{0.26}Mn_{0.7}Mg_{0.0349}Co_{0.05}Ca_{0.001}PO_4$ will be described.

$Li_3PO_4$ was used as a Li source and a P source, a $FeSO_4$ aqueous solution was used as a Fe source, and a $MnSO_4$ aqueous solution was used as an Mn source, $MgSO_4$ was used as an Mg source, a $CoSO_4$ aqueous solution was used as a Co source, and a $CaSO_4$ aqueous solution was used as a Ca source, and these sources were mixed with each other such that a molar ratio $Li:Fe:Mn:Mg:Co:Ca:P$ of Li, Fe, Mn, Mg, Co, Ca, and P was 1:0.26:0.7:0.0349:0.05:0.001:1. As a result, a 2.2 L raw material slurry A was prepared.

Next, the raw material slurry A was put into a pressure resistant vessel.

Next, the raw material slurry A was heated at 190° C. for 12 hours to perform a hydrothermal synthesis. At this time, the internal pressure of the pressure resistant vessel was 1.0 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFe_{0.26}Mn_{0.7}Mg_{0.0349}Co_{0.05}Ca_{0.001}PO_4$ (LFMP) particles.

Next, synthesis of $Li_{1.3}Al_{0.3}Ti_{1.7}(PO_4)_3$ will be described.

$Li_2CO_3$ was used as a Li source, $Al_2O_3$ was used as an Al source, $TiO_2$ was used as a Ti source, and $NF_4H_2PO_4$ was used as a $PO_4$ source, and these sources were mixed with each other using a ball mill for 10 hours such that a molar ratio $Li:Al:Ti:PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)_3$ particles were obtained.

Next, 90.24% by mass of the LFMP particles and 5.76% by mass of the $Li_{1.3}Al_{0.3}Ti_{1.7}(PO_4)_3$ particles were mixed with each other, 4% by mass of polyvinyl alcohol having a solid content of 20% by mass that was adjusted in advance with respect to the mixture was dispersed in water solvent to prepare a raw material slurry D, and the raw material slurry D was dried and granulated and then was heated at 750° C. for 1 hour. As a result, surfaces of the LFMP particles and the $Li_{1.3}Al_{0.3}Ti_{1.7}(PO_4)_3$ particles were coated with the carbonaceous film, and a positive electrode material for lithium ion secondary batteries according to Example 6 was obtained.

Comparative Example 3

$LiFe_{0.26}Mn_{0.7}Mg_{0.0349}Co_{0.05}Ca_{0.001}PO_4$ was produced as follows.

$Li_3PO_4$ was used as a Li source and a P source, a $FeSO_4$ aqueous solution was used as a Fe source, and a $MnSO_4$ aqueous solution was used as an Mn source, $MgSO_4$ was used as an Mg source, a $CoSO_4$ aqueous solution was used as a Co source, and a $CaSO_4$ aqueous solution was used as a Ca source, and these sources were mixed with each other such that a molar ratio $Li:Fe:Mn:Mg:Co:Ca:P$ of Li, Fe, Mn, Mg, Co, Ca, and P was 1:0.26:0.7:0.0349:0.05:0.001:1. As a result, a 2.2 L raw material slurry A was prepared.

Next, the raw material slurry A was put into a pressure resistant vessel.

Next, the raw material slurry A was heated at 190° C. for 12 hours to perform a hydrothermal synthesis. At this time, the internal pressure of the pressure resistant vessel was 1.0 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiFe_{0.26}Mn_{0.7}Mg_{0.0349}Co_{0.05}Ca_{0.001}PO_4$ (LFMP) particles.

4% by mass of polyvinyl alcohol having a solid content of 20% by mass that was adjusted in advance with respect to 96% by mass of the $LiFe_{0.26}Mn_{0.7}Mg_{0.0349}Co_{0.05}Ca_{0.001}PO_4$ (LFMP) particles was dispersed in water solvent to prepare a raw material slurry B, and the raw material slurry B was dried and granulated, and was heated at 750° C. for 1 hour such that surfaces of the LFP particles were coated with the carbonaceous film. As a result, a positive electrode material for lithium ion secondary batteries according to Comparative Example 3 was obtained.

Comparative Example 4

A positive electrode material for lithium ion secondary batteries according to Comparative Example 4 was obtained using the same method as that of Example 4, except that 10% by mass of the $Li_{1.3}Al_{0.3}Ti_{1.7}(PO_4)_3$ particles with respect to 90% by mass of the cracked LFMP particles were dispersed in water solvent to prepare a raw material slurry C, and the raw material slurry C was dried and granulated.

Example 7

A mixture including $LiCoPO_4$ and $Li_{1.3}Al_{0.3}Ti_{1.7}(PO_4)^3$ was produced as follows.

First, synthesis of $LiCoPO_4$ will be described.

$Li_3PO_4$ was used as a Li source and a P source, a $CoSO_4$ aqueous solution was used as a Co source, and these sources were mixed with each other such that a molar ratio Li:Co:P between Li, Co, and P was 3:1:1. As a result, a 2.2 L raw material slurry A was prepared.

Next, the raw material slurry A was put into a pressure resistant vessel.

Next, the raw material slurry A was heated at 190° C. for 24 hours to perform a hydrothermal synthesis. At this time, the internal pressure of the pressure resistant vessel was 1.01 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiCoPO_4$ (LCP) particles.

4% by mass of polyvinyl alcohol having a solid content of 20% by mass that was adjusted in advance with respect to 96% by mass of the $LiCoPO_4$ (LCP) particles was dispersed in water solvent to prepare a raw material slurry B, the raw material slurry B was dried and granulated, and was heated at 700° C. for 1 hour such that surfaces of the LCP particles were coated with the carbonaceous film.

Next, using a jet mill (trade name: SJ-100, manufactured by Nisshin Engineering Inc.), the granulated LCP particles were cracked under conditions of a supply rate of 200 g/h.

Next, synthesis of $Li_{1.3}Al_{0.3}Ti_{1.7}(PO_4)^3$ will be described.

$Li_2CO_3$ was used as a Li source, $Al_2O_3$ was used as an Al source, $TiO_2$ was used as a Ti source, and $NF_4H_2PO_4$ was used as a $PO_4$ source, and these sources were mixed with each other using a ball mill for 10 hours such that a molar ratio Li:Al:Ti:$PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)^3$ particles 30 were obtained.

Next, 1% by mass of the $Li_{1.3}Al_{0.3}Ti_{1.7}(PO_4)^3$ particles with respect to 99% by mass of the cracked LCP particles were dispersed in water solvent to prepare a raw material slurry C, and the raw material slurry C was dried and granulated. As a result, a mixture in which the $Li_{1.3}Al_{0.3}Ti_{1.7}(PO_4)^3$ particles were uniformly present as the LCP particles in the mixture secondary particles was produced, and a positive electrode material for lithium ion secondary batteries according to Example 7 was obtained.

Example 8

A positive electrode material for lithium ion secondary batteries according to Example 8 was obtained using the same method as that of Example 7, except that 4% by mass of the $Li_{1.3}Al_{0.3}Ti_{1.7}(PO_4)^3$ particles with respect to 96% by mass of the cracked LCP particles were dispersed in water solvent to prepare a raw material slurry C, and the raw material slurry C was dried and granulated.

Example 9

A mixture including $LiCoPO_4$ and $Li_{1.3}Al_{0.3}Ti_{1.7}(PO_4)^3$ was produced as follows.

First, synthesis of $LiCoPO_4$ will be described.

$Li_3PO_4$ was used as a Li source and a P source, a $CoSO_4$ aqueous solution was used as a Co source, and these sources were mixed with each other such that a molar ratio Li:Co:P between Li, Co, and P was 3:1:1. As a result, a 2.2 L raw material slurry A was prepared.

Next, the raw material slurry A was put into a pressure resistant vessel.

Next, the raw material slurry A was heated at 190° C. for 24 hours to perform a hydrothermal synthesis. At this time, the internal pressure of the pressure resistant vessel was 1.01 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours to obtain $LiCoPO_4$ (LCP) particles.

Next, synthesis of $Li_{1.3}Al_{0.3}Ti_{1.7}(PO_4)^3$ will be described.

$Li_2CO_3$ was used as a Li source, $Al_2O_3$ was used as an Al source, $TiO_2$ was used as a Ti source, and $NF_4H_2PO_4$ was used as a $PO_4$ source, and these sources were mixed with each other using a ball mill for 10 hours such that a molar ratio Li:Al:Ti:$PO_4$ of Li, Al, Ti, and $PO_4$ were 1.3:0.3:1.7:3.

Next, this mixture was pre-calcinated in air at 300° C. for 6 hours.

Next, the pre-calcinated mixture was crushed and mixed using an automated mortar for 1 hour and was further calcinated at 900° C. for 28 hours. As a result, $Li_{1.3}Al_{0.3}Ti_{1.7}(PO_4)^3$ particles were obtained.

Next, 90.24% by mass of the LCP particles and 5.76% by mass of the $Li_{1.3}Al_{0.3}Ti_{1.7}(PO_4)^3$ particles were mixed with each other, 4% by mass of polyvinyl alcohol having a solid content of 20% by mass that was adjusted in advance with respect to the mixture was dispersed in water solvent to prepare a raw material slurry D, and the raw material slurry D was dried and granulated and then was heated at 750° C. for 1 hour. As a result, surfaces of the LCP particles and the $Li_{1.3}Al_{0.3}Ti_{1.7}(PO_4)^3$ particles were coated with the carbonaceous film, and a positive electrode material for lithium ion secondary batteries according to Example 9 was obtained.

Comparative Example 5

$LiCoPO_4$ was produced as follows.

$Li_3PO_4$ was used as a Li source and a P source, a CoSO4 aqueous solution was used as a Co source, and these sources were mixed with each other such that a molar ratio Li:Co:P between Li, Co, and P was 3:1:1. As a result, a 2.2 L raw material slurry A was prepared.

Next, the raw material slurry A was put into a pressure resistant vessel.

Next, the raw material slurry A was heated at 190° C. for 24 hours to perform a hydrothermal synthesis. At this time, the internal pressure of the pressure resistant vessel was 1.0 MPa.

After the reaction, the atmosphere in a heat-resistant vessel was cooled to room temperature to obtain a cake-like precipitate of a reaction product.

This precipitate was sufficiently cleaned with distilled water multiple times, and the water content was maintained at 40% to prevent drying. As a result, a cake-like material was obtained.

This cake-like material was dried in a vacuum at 70° C. for 2 hours, 4% by mass of polyvinyl alcohol having a solid content of 20% by mass that was adjusted in advance with respect to 96% by mass of the $LiCoPO_4$ (LCP) particles was dispersed in water solvent to prepare a raw material slurry B, and the raw material slurry B was dried and granulated, and was heated at 750° C. for 1 hour such that surfaces of the LCP particles were coated with the carbonaceous film. As a result, a positive electrodematerial for lithium ion secondary batteries according to Comparative Example 5 was obtained.

A positive electrode material for lithium ion secondary batteries according to Comparative Example 6 was obtained using the same method as that of Example 7, except that 10% by mass of the $Li_{1.3}Al_{0.3}Ti_{1.7}(PO_4)_3$ particles with respect to 90% by mass of the cracked LCP particles were dispersed in water solvent to prepare a raw material slurry C, and the raw material slurry C was dried and granulated.

Evaluation of Electrode Material

Regarding the positive electrode material for lithium ion secondary batteries obtained in each of the Examples 1 to 9 and Comparative Examples 1 to 6 and the components in the positive electrode material for lithium ion secondary batteries, physical properties were evaluated. Evaluation methods are as follows. The results are shown in Table 1.

(1) Amount of Carbon

Using a carbon analyzer (model number: EMIA-220V, manufactured by Horiba Ltd.), the amount of carbon in the positive electrode material for lithium ion secondary batteries obtained in each of Examples 1 to 9 and Comparative Examples 1 to 6 was measured.

(2) Specific Surface Area

Using a specific surface area meter (trade name: BEL-SORP-mini, manufactured by Bel Japan Inc.), the specific surface area of the positive electrode material for lithium ion secondary batteries obtained in each of Examples 1 to 9 and Comparative Examples 1 to 6 was measured with a BET method using nitrogen ($N_2$) adsorption.

(3) Average Primary Particle Diameter

By observing the LFP particles, the LFMP particles, the LCP particles, and the $Li_{1.3}Al_{0.3}Ti_{1.7}(PO_4)_3$ particles obtained in each of Examples 1 to 9 and Comparative Examples 1 to 6 with a scanning electron microscope (SEM, trade name: S-4800, manufactured by Hitachi High-Tech Corporation), the average primary particle diameters of the LFP particles, the LFMP particles, the LCP particles, and the $Li_{1.3}Al_{0.3}Ti_{1.7}(PO_4)_3$ particles obtained in each of Examples 1 to 9 and Comparative Examples 1 to 6 were obtained from the obtained scanning electron microscope images.

(4) Volume 50% Particle Diameter (D50)

Using a laser diffraction/scattering particle diameter analyzer (trade name: LA-950, manufactured by Horiba Ltd.), the volume 50% particle diameter (D50) of the positive electrode material for lithium ion secondary batteries obtained in each of Examples 1 to 9 and Comparative Examples 1 to 6 was measured.

Preparation of Laminated Lithium Ion Secondary Battery

90% by mass of the positive electrode material for lithium ion secondary batteries obtained in each of Examples 1 to 9 and Comparative Examples 1 to 6, 5% by mass of acetylene black (AB) as a conductive auxiliary agent, and 5% by mass of polyvinylidene fluoride (PVdF) as a binder were added to N-methyl-2-pyrrolidinone (NMP) and were mixed with each other to prepare a slurry.

Next, this slurry was applied to both surface of a current collector formed of aluminum foil having a thickness of 15 μm to form a coating film, and this coating film was dried to form a positive electrode mixture layer on the surfaces of the aluminum foil. Next, the positive electrode mixture layer was pressed such that a predetermined density was obtained. As a result, a positive electrode was obtained.

90% by mass of natural graphite powder, 5% by mass of acetylene black (AB), and 5% by mass of polyvinylidene fluoride (PVdF) were added to N-methyl-2-pyrrolidinone (NMP) and were mixed with each other to prepare a slurry.

Next, this slurry was applied to both surface of a current collector formed of copper foil having a thickness of 15 μm to form a coating film, and this coating film was dried to form a negative electrode mixture layer on the surfaces of the copper foil. Next, the negative electrode mixture layer was pressed such that a predetermined density was obtained. As a result, a negative electrode was obtained.

The obtained positive electrode was cut into a size of length 2.8 cm×width 2.6 cm, the negative electrode was cut into a size of length 3.0 cm×width 2.8 cm, and a porous polypropylene film having a thickness of 25 μm as a separator was cut into a size of length 3.2 cm×width 3.2 cm.

Next, eight negative electrodes, seven positive electrodes, and eight separators each of which was disposed between the negative electrode and the positive electrode were alternately disposed to form an electrode laminate.

Next, the electrode laminate was interposed between two aluminum laminate films, three sides excluding a long single side were thermally sealed at a width of 8 mm, an electrolytic solution was injected, and the remaining single side was thermally sealed to prepare a laminated lithium ion secondary battery.

As the electrolytic solution, a solution obtained by mixing ethylene carbonate and diethyl carbonate with each other at 1:1 (mass ratio) and adding 1 mol/L of lithium hexafluorophosphate ($LiPF_6$) solution to the mixture to dissolve the mixture was used.

Evaluation of Lithium Ion Secondary Battery (1) 3C Discharge Capacity

At an environmental temperature of 25° C., constant current charge was performed at a current value of 0.1 CA until the voltage of the positive electrode reached 4.1 V relative to the voltage of the negative electrode formed of natural graphite for the lithium ion secondary battery prepared using the positive electrode material for lithium ion secondary batteries obtained in each of Examples 1 to 3 and Comparative Examples 1 and 2, until the voltage of the positive electrode reached 4.2 V relative to the voltage of the negative electrode formed of natural graphite for the lithium ion secondary battery prepared using the positive electrode material for lithium ion secondary batteries obtained in each of Examples 4 to 6 and Comparative Examples 3 and 4, and until the voltage of the positive electrode reached 5.0 V relative to the voltage of the negative electrode formed of natural graphite for the lithium ion secondary battery prepared using the positive electrode material for lithium ion secondary batteries obtained in each of Examples 7 to 9 and Comparative Examples 5 and 6. After the target voltage was reached, constant voltage charge was performed until the current value reached 0.01 CA.

Next, the lithium ion secondary battery was rested for 1 minute, and then at an environmental temperature of 25° C., constant-current discharge was performed at 3CA until the voltage of the positive electrode reached 2.0 V relative to the balanced voltage of Li, and the 3 C discharge capacity was evaluated. The results are shown in Table 1.

(2) Cell Temperature During 3 C Charge

Battery characteristics of the lithium ion secondary battery were evaluated. At an environmental temperature of 25° C., constant-current charge was performed at a current value of 3 CA until the voltage of the positive electrode reached 4.1 V relative to the voltage of the negative electrode formed of natural graphite for the lithium ion secondary battery prepared using the positive electrode material for lithium ion secondary batteries obtained in each of Examples 1 to 3 and Comparative Examples 1 and 2, until the voltage of the positive electrode reached 4.2 V relative to the voltage of the negative electrode formed of natural graphite for the lithium ion secondary battery prepared using the positive electrode material for lithium ion secondary batteries obtained in each of Examples 4 to 6 and Comparative Examples 3 and 4, and until the voltage of the positive electrode reached 5.0 V relative to the voltage of the negative electrode formed of natural graphite for the lithium ion secondary battery prepared using the positive electrode material for lithium ion secondary batteries obtained in each of Examples 7 to 9 and Comparative Examples 5 and 6. When the target voltage was reached, the temperature of the cell surface was measured. The constant current charge at a current value of 3 CA was assumed as high-speed charge. The results are shown in Table 1.

TABLE 1

| | Positive Electrode Active Material A | NASICON-type Compound B | A:B Weight Ratio | Specific Surface Area [m²/g] | A Average Primary Particle Diameter [nm] | B Average Primary Particle Diameter [nm] | Amount of Carbon [wt. %] | D50 [μm] | 3 C Discharge Capacity [mAh/g] | Cell Temperature at 3 C Charge [° C.] |
|---|---|---|---|---|---|---|---|---|---|---|
| Example 1 | $LiFePO_4$ | $Li_{1.3}Al_{0.1}Ti_{1.7}(PO_4)_3$ | 99:1 | 11.2 | 241 | 452 | 0.99 | 7.5 | 153 | 39.1 |
| Example 2 | $LiFePO_4$ | $Li_{1.3}Al_{0.3}Ti_{1.7}(PO_4)_3$ | 94:6 | 10.6 | 226 | 469 | 0.96 | 7.8 | 149 | 38.6 |
| Example 3 | $LiFePO_4$ | Carbon Film $Li_{1.3}Al_{0.1}Ti_{1.7}(PO_4)_3$ | 94:6 | 11.1 | 253 | 437 | 1.10 | 8.1 | 151 | 37.7 |
| Comparative Example 1 | $LiFePO_4$ | None | 100:0 | 11.8 | 234 | None | 1.02 | 7.2 | 155 | 32.3 |
| Comparative Example 2 | $LiFePO_4$ | $Li_{1.3}Al_{0.1}Ti_{1.7}(PO_4)_3$ | 90:10 | 10.2 | 235 | 498 | 0.94 | 7.8 | 134 | 37.5 |
| Example 4 | $LiFe_{0.26}Mn_{0.7}Mg_{0.0349}Co_{0.05}Ca_{0.001}PO_4$ | $Li_{1.3}Al_{0.1}Ti_{1.7}(PO_4)_3$ | 99:1 | 21.4 | 124 | 475 | 1.56 | 5.2 | 141 | 41.3 |
| Example 5 | $LiFe_{0.26}Mn_{0.7}Mg_{0.0349}Co_{0.05}Ca_{0.001}PO_4$ | $Li_{1.3}Al_{0.3}Ti_{1.7}(PO_4)_3$ | 94:6 | 20.8 | 127 | 467 | 1.51 | 4.8 | 139 | 39 |
| Example 6 | $LiFe_{0.26}Mn_{0.7}Mg_{0.0349}Co_{0.05}Ca_{0.001}PO_4$ | Carbon Film $Li_{1.3}Al_{0.3}Ti_{1.7}(PO_4)_3$ | 94:6 | 21.2 | 112 | 482 | 1.64 | 4.2 | 144 | 38.7 |
| Comparative Example 3 | $LiFe_{0.26}Mn_{0.7}Mg_{0.0349}Co_{0.05}Ca_{0.001}PO_4$ | None | 100:0 | 22.0 | 133 | None | 1.62 | 5.9 | 145 | 55.5 |
| Comparative Example 4 | $LiFe_{0.26}Mn_{0.7}Mg_{0.0349}Co_{0.05}Ca_{0.001}PO_4$ | $Li_{1.3}Al_{0.3}Ti_{1.7}(PO_4)_3$ | 90:10 | 20.1 | 142 | 437 | 1.47 | 5.6 | 119 | 41.6 |
| Example 7 | $LiCoPO_4$ | $Li_{1.3}Al_{0.3}Ti_{1.7}(PO_4)_3$ | 99:1 | 24.3 | 98 | 455 | 2.16 | 10.2 | 132 | 43.5 |
| Example 8 | $LiCoPO_4$ | $Li_{1.3}Al_{0.1}Ti_{1.7}(PO_4)_3$ | 94:6 | 22.2 | 102 | 469 | 2.13 | 11.5 | 128 | 42.9 |
| Example 9 | $LiCoPO_4$ | Carbon Film $Li_{1.3}Al_{0.1}Ti_{1.7}(PO_4)_3$ | 94:6 | 22.2 | 94 | 429 | 2.13 | 9.9 | 134 | 41.9 |
| Comparative Example 5 | $LiCoPO_4$ | None | 100:0 | 25.6 | 89 | None | 2.19 | 11.7 | 129 | 60.4 |
| Comparative Example 6 | $LiCoPO_4$ | $Li_{1.3}Al_{0.3}Ti_{1.7}(PO_4)_3$ | 90:10 | 21.4 | 103 | 429 | 2.08 | 10.6 | 104 | 44.5 |

It was found from the results of Table 1 that, in Examples 1 to 9, the discharge capacity was high and an increase in the temperature of the lithium ion secondary battery during high-speed charge was able to be suppressed.

On the other hand, it was found that, in Comparative Examples 1 to 6, the discharge capacity was equal to that of Examples 1 to 9 but an increase in the temperature of the lithium ion secondary battery during high-speed charge was not able to be suppressed.

The present invention can provide a positive electrode material for lithium ion secondary batteries that has excellent discharge capacity and can suppress an increase in the temperature of a lithium ion secondary battery during high-speed charge such as a charge rate of 3 C, a positive electrode for lithium ion secondary batteries, and a lithium ion secondary battery. A positive electrode material for lithium ion secondary batteries according to the present invention includes a mixture including a positive electrode active material in which a length of a longest side of a primary particle is 1 nm or more and 1000 nm or less and a NASICON-type compound in which a length of a longest side of a primary particle is 1 nm or more and 1000 nm or less. Therefore, the discharge capacity is excellent, and an increase in the temperature of the lithium ion secondary battery during high-speed charge can be suppressed. Thus, the positive electrode material for lithium ion secondary batteries is applicable to the next-generation secondary battery in which high voltage, high energy density, high load characteristics, and high-speed charge and discharge characteristics are expected. In the case of the next-generation secondary battery, the effects are significant.

What is claimed is:

1. A positive electrode material for lithium ion secondary batteries, comprising a mixture which includes:
    a positive electrode active material in which a length of a longest side of a primary particle of the active material is 1 nm or more and 1000 nm or less; and
    A NASICON-type compound in which a length of a longest side of a primary particle of the compound is 1 nm or more and 1000 nm or less,
    wherein, the positive electrode active material is at least one selected from a group consisting of $Li_3FePO_4$, $LiFe_{0.26}Mn_{0.7}Mg_{0.0349}Co_{0.05}Ca_{0.001}PO_4$, and $LiCoPO_4$, and
    the NASICON-type compound is represented by formula $Li_aAl_bTi_{2-b}(PO_4)_3$, and
    a mixing ratio by mass of the positive electrode active material to the NASICON-type compound is from 99:1 to 90.5:9.5, wherein $0.8 \leq a \leq 1.5$ and $0 \leq b \leq 0.5$.

2. The positive electrode material for lithium ion secondary batteries according to claim 1,
    wherein
    a specific surface area of the mixture is 7 m²/g or more and 40 m²/g or less, and
    wherein when 50% of a volume particle diameter of secondary particles of the mixture is represented by D50, D50 is 2 μm or more and 12 μm or less.

3. The positive electrode material for lithium ion secondary batteries according to claim 1,
    wherein one of, or both of, a surface of the primary particle of the positive electrode active material and a surface of the primary particle of the NASICON-type compound are coated with a carbonaceous film having a thickness of 1 nm or more and 10 nm or less.

4. A positive electrode for lithium ion secondary batteries, the positive electrode comprising:
    an electrode current collector; and
    a positive electrode mixture layer that is formed on the electrode current collector,
    wherein the positive electrode mixture layer includes the positive electrode material for lithium ion secondary batteries according to claim 1.

5. A lithium ion secondary battery comprising:
    a positive electrode;
    a negative electrode; and
    a non-aqueous electrolyte,
    wherein the positive electrode in the positive electrode for lithium ion secondary batteries according to claim 4.

6. The positive electrode material for lithium ion secondary batteries according to claim 1,
    wherein the length of a longest side of a primary particle of the active material is 50 nm or more and 500 nm or less, and
    the length of a longest side of a primary particle of the NASICON-type compound is 200 nm or more and 800 nm or less.

7. The positive electrode material for lithium ion secondary batteries according to claim 1,
    wherein the length of the longest side of the primary particles of the active material is an average value of the lengths of the longest sides of 100 primary particles, and
    the length of the longest side of the primary particles of the NASICON-type compound is an average value of the lengths of longest sides of 100 primary particles.

8. The positive electrode material for lithium ion secondary batteries according to claim 3,
    wherein the carbonaceous film is a pyrolytic carbon film that is obtained by carbonizing an organic compound.

9. The positive electrode material for lithium ion secondary batteries according to claim 1,
    wherein the mixture includes a secondary particle which includes the primary particle of the active material and the primary particles of the NASICON-type compound.

10. The positive electrode material for lithium ion secondary batteries according to claim 9,
    wherein the secondary particle is covered by a carbonaceous film which consists of a pyrolytic carbon film.

11. The positive electrode material for lithium secondary batteries according to claim 9,
    wherein the secondary particle is not covered by a carbonaceous film.

12. The positive electrode material for lithium ion secondary batteries according to claim 1,
    wherein the mixing ratio by mass of the positive electrode active material to the NASICON-type compound is from 99:1 to 94:6.

* * * * *